(12) United States Patent
Scott-Collins et al.

(10) Patent No.: US 12,523,079 B2
(45) Date of Patent: Jan. 13, 2026

(54) ELECTRICAL CHARGING FLAP

(71) Applicant: MOTHERSON INNOVATIONS COMPANY LIMITED, London (GB)

(72) Inventors: Callum Scott-Collins, Portchester (GB); Steve Horne, Portchester (GB); Andrew Lettis, Portchester (GB); Oscar Malicki, Portchester (GB); Kane Connor, Portchester (GB); Matthew McKay, Portchester (GB)

(73) Assignee: Motherson Innovations Company Limited, London (GB)

( * ) Notice: Subject to any disclaimer, the term of this patent is extended or adjusted under 35 U.S.C. 154(b) by 959 days.

(21) Appl. No.: 17/710,089

(22) Filed: Mar. 31, 2022

(65) Prior Publication Data

US 2023/0151669 A1 May 18, 2023

Related U.S. Application Data

(60) Provisional application No. 63/280,895, filed on Nov. 18, 2021.

(51) Int. Cl.
| | |
|---|---|
| *E05F 15/611* | (2015.01) |
| *B60L 53/16* | (2019.01) |
| *E05B 81/04* | (2014.01) |
| *E05B 83/34* | (2014.01) |
| *E05D 5/02* | (2006.01) |
| *F16J 15/02* | (2006.01) |
| *H01R 13/52* | (2006.01) |

(52) U.S. Cl.
CPC ............ *E05F 15/611* (2015.01); *B60L 53/16* (2019.02); *E05B 81/04* (2013.01); *E05B 83/34* (2013.01); *E05D 5/0207* (2013.01); *F16J 15/022* (2013.01); *H01R 13/5202* (2013.01); *H01R 13/5213* (2013.01); *E05Y 2900/534* (2013.01)

(58) Field of Classification Search
CPC ........ E05F 15/611; B60L 53/16; E05B 81/04; E05B 83/34; E05D 5/0207; F16J 15/022; H01R 13/5202; H01R 13/5213; E05Y 2900/534; B60K 15/05; B60K 2015/0507; B60K 2015/0515; B60K 2015/053; B60K 2015/0538
USPC ...................................................... 296/97.22
See application file for complete search history.

(56) References Cited

U.S. PATENT DOCUMENTS

| | | | |
|---|---|---|---|
| 2012/0047807 A1* | 3/2012 | Lee ......................... | B60K 15/05 49/349 |
| 2016/0375761 A1* | 12/2016 | Horikawa ............... | E05B 81/40 49/276 |

(Continued)

FOREIGN PATENT DOCUMENTS

| | | | | |
|---|---|---|---|---|
| CN | 102826131 B | * | 6/2016 | ............. E05B 81/06 |
| CN | 108698505 A | * | 10/2018 | ............. B60K 15/05 |

(Continued)

*Primary Examiner* — Hilary L Gutman
(74) *Attorney, Agent, or Firm* — Jones Day

(57) ABSTRACT

A hinge arm assembly for a charge flap arrangement of a motor vehicle includes a housing cap having at least one flexible hinge arm support, a charge flap housing coupled partially with the flexible hinge arm support, a hinge arm with a built-in drive shaft clipped into the housing cap and hold in place with clamping force, an actuator coupled to the built-in drive shaft, and at least one sealing component arranged between the actuator and the housing cap.

11 Claims, 4 Drawing Sheets

Section Cut E-E

(56) References Cited

U.S. PATENT DOCUMENTS

| | | | | |
|---|---|---|---|---|
| 2022/0136292 A1* | 5/2022 | Sun | ............ | E05B 81/18 |
| | | | | 49/280 |
| 2022/0213728 A1* | 7/2022 | Ilardo | ............ | B60K 15/05 |
| 2023/0049181 A1* | 2/2023 | Couto Maquieira | ... | E05B 79/20 |
| 2023/0241964 A1* | 8/2023 | Sun | ............ | B60L 53/16 |
| | | | | 296/97.22 |
| 2024/0011346 A1* | 1/2024 | Sproule | ............ | E05B 83/34 |
| 2024/0083243 A1* | 3/2024 | Sun | ............ | E05B 83/34 |

FOREIGN PATENT DOCUMENTS

| | | | | | |
|---|---|---|---|---|---|
| CN | 109050302 | A | * | 12/2018 | |
| CN | 113474204 | A | * | 10/2021 | ............ B60K 15/05 |
| CN | 113548118 | A | * | 10/2021 | |
| CN | 114150944 | A | * | 3/2022 | |
| CN | 114435120 | A | * | 5/2022 | ............ B60K 15/05 |
| CN | 114435487 | A | * | 5/2022 | ............ E05F 15/63 |
| CN | 114450184 | A | * | 5/2022 | ............ B60K 15/05 |
| CN | 114590327 | A | * | 6/2022 | |
| CN | 114919400 | A | * | 8/2022 | |
| CN | 115961852 | A | * | 4/2023 | ............ E05F 15/614 |
| CN | 115961855 | A | * | 4/2023 | ............ E05F 15/614 |
| CN | 117948008 | A | * | 4/2024 | |
| CN | 120171646 | A | * | 6/2025 | ............ B60K 15/05 |
| DE | 102008057860 | A1 | * | 7/2010 | ............ B60K 15/05 |
| DE | 102014104501 | A1 | * | 10/2015 | ............ B60K 15/05 |
| DE | 102019128551 | A1 | * | 4/2020 | ............ B60K 15/05 |
| DE | 102019120718 | A1 | * | 2/2021 | ............ B60K 15/05 |
| DE | 102019134088 | A1 | * | 6/2021 | ............ E05D 3/125 |
| DE | 102022116864 | A1 | * | 4/2023 | ............ E05D 7/0027 |
| DE | 102023103567 | A1 | * | 4/2024 | ............ B62D 25/24 |
| DE | 102023209543 | A1 | * | 4/2024 | ............ B60K 15/05 |
| DE | 102024114166 | A1 | * | 6/2025 | ............ E05D 15/10 |
| EP | 1295748 | A2 | * | 3/2003 | ............ B60K 15/05 |
| JP | 4002616 | B2 | * | 11/2007 | ......... B65D 47/0842 |
| KR | 101467422 | B1 | * | 12/2014 | ............ E05F 15/41 |
| WO | WO-2022160132 | A1 | * | 8/2022 | ............ B60K 15/05 |

* cited by examiner

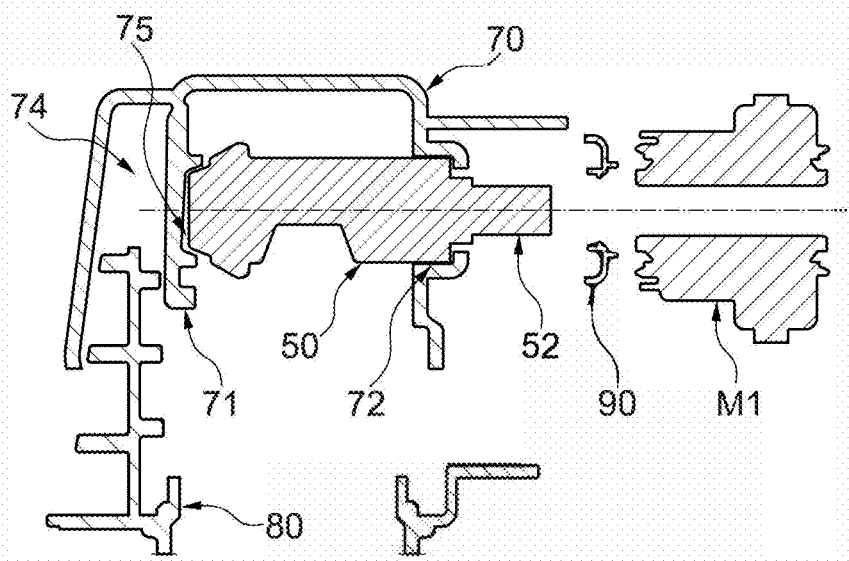
Section Cut E-E     Fig. 6
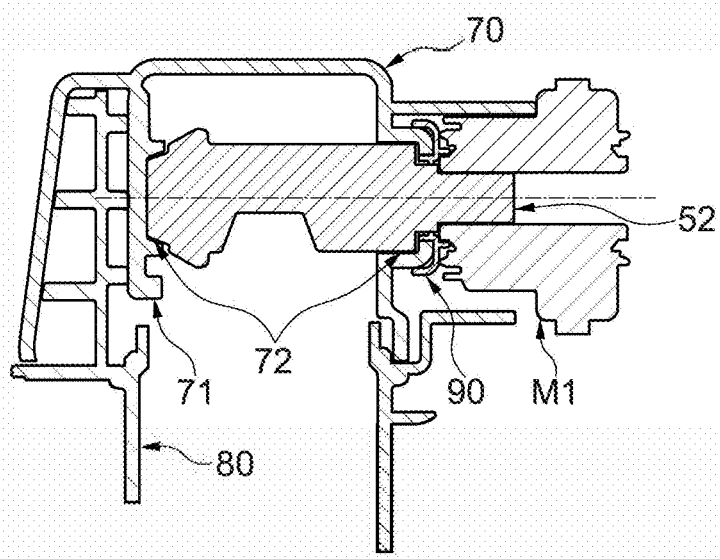
Section Cut E-E     Fig. 7

ELECTRICAL CHARGING FLAP

CROSS-REFERENCE TO RELATED APPLICATIONS

This application claims priority from U.S. Provisional Application No. 63/280,895 filed on Nov. 18, 2021, the contents of which are incorporated herein by reference.

FIELD OF THE INVENTION

The following description relates to a charge flap arrangement comprising an engagement feature, a sealing unit for said charge flap arrangement, a hinge arm assembly for said charge flap arrangement and a method for assembling said hinge arm assembly.

BACKGROUND OF THE INVENTION

Tank or charging modules for vehicles are used to close a tank filler pipe or a charging plug or other connections for refueling or repowering in a first position of a flap and to release it in a second, open position of the flap. For this purpose, the tank or loading flaps of the modules close flush with the surface of the vehicle body in the closed position and also seal the tank or loading trough against the environment via corresponding seals on the flap or on the trough body. With this arrangement it should be ascertained that no debris, such as water, dirt, ice and the like finds its way into the tank or loading trough. The trough body itself is fixed to the vehicle and has an opening through which the insertion tube or the charging plug is guided.

The (charge or tank) flap should securely rest in place in a first position when no tanking or charging operation is undertaken and should easily be opened using a simple opening mechanism. Furthermore, the charge flap should also rest in a second position during refueling or repowering situation, wherein the second position should not interfere with the refuel or repowering action.

Several problems arise in connection with such tank or charging modules. First, to ensure that the flap can be opened, a certain amount of pressure is needed in order to actuate a locking or unlocking mechanism. This amount of pressure can damage the opening mechanism, such as digital pressure sensors. Second, several sealings are necessary at different locations of the tank or charging modules to ensure that the inner part of the tank or charging modules, i.e. the housing thereof, is protected from different environmental influences such as water, snow, wind and/or dirt. This makes the overall design and preparation process of the tank difficult. Third, nowadays the tank or charge flap may be opened and closed by use of a motor. The current design for such a motor driven flap is characterized by the use of several different parts to link together the different drive A necessary components, such as the motor (actuator), a drive shaft, a hinge arm, one or more sealings and a housing which fixes these components in place and which ensures a trouble-free functioning of the system. The amount of components implies a high complexity of the assembling process and furthermore it implies many weak points detrimental to the frequent use of such a charge flap arrangement.

SUMMARY

In embodiments of the present disclosure, a charge flap arrangement is provided comprising an engagement feature for controlling an opening mechanism for the charge flap. In embodiments, a sealing unit is provided that is adapted to be installed on a charge flap housing of a motor vehicle for simultaneously fulfilling several functions within the charge flap housing. In embodiments, a structurally simplified hinge arm assembly is provided for opening and closing the charge flap and a method is provided for a reduced complexity by assembling said hinge arm assembly.

In embodiments, the present disclosure provides a charge flap arrangement of a motor vehicle, comprising a frame including an aperture and a housing having an interior, a 2K charge flap to close the aperture and having an engaging feature absorbing compressive forces, a charging socket within the interior of the housing and a flap releasing button located on the charging socket and opposite the engaging feature, wherein the flap releasing button is adapted to control a locking arrangement of the charge flap, wherein the engaging feature has a shape and is made from a material that is capable of absorbing forces in the range of 5 to 100 N in order to protect the flap releasing button from over pressurizing and, wherein the engagement feature is adapted to actuate the flap releasing button.

According to one embodiment, the engaging feature may have any form and may be made from any material that is suitable to provide the necessary overpressure stability and/or force absorption capability. For example, the engaging feature may have a zig-zag shape, wave shape, folded shape, honeycomb shape, or combinations thereof, but is not limited thereto. The engaging feature may be of a rubber material or plastic material, but is not limited thereto. The force may be adapted according to any specific requirements, for example may be in the range of 5.5 to 52 N. The locking of the charge flap may be achieved by any suitable locking tool, such as by a mechanical arrangement, by a magnetic arrangement and/or by an electrical arrangement.

In embodiments, the present disclosure provides a motor vehicle comprising the charge flap arrangement provided herein.

In embodiments, the present disclosure provides a sealing unit adapted for sealing a charge flap housing of a motor vehicle, wherein the sealing unit is provided in form of a 2K component comprising a charge flap housing and at least three sealing zones that provide simultaneous sealing to one or more parts of the charge flap housing, wherein the at least three sealing zones each comprise at least one sealing lip. Different sealing lips may be provided in this aspect to provide different degrees of protection according to, for example, ISO 20653 and/or DIN EN 60529.

In embodiments, the sealing unit provides sealing to different parts of the charge flap housing. Generally, sealing may be provided to any part which needs to be sealed from any environmental influence. For example, sealing may be provided to one or more of a charge socket, to one or more body panels, a charge flap, a locking mechanism and/or a base. The sealing unit may provide sealing to one or more of the aforementioned parts, preferably two or more of the aforementioned parts. However, sealing to other parts of the charge flap housing may also be provided. For example, the sealing may be simultaneously provided to the charge socket, to one or more body panels, the charge flap, the locking mechanism and the base. Furthermore, the different sealing lips may be independently formed from different materials that provide sealing capability. Sealing capability, as used herein, means that the sealing is air-tight, water-tight, and/or dust-tight. In one embodiment, the sealing material is compressible. Suitable materials may be rubber or plastic materials.

In another embodiment, the present disclosure provides a charge flap housing of a motor vehicle comprising at least one sealing unit provided herein.

In another embodiment, the present disclosure provides a hinge arm assembly for a charge flap arrangement of a motor vehicle, the hinge arm assembly comprises a housing cap having at least one flexible hinge arm support; a charge flap housing coupled partially with the flexible hinge arm support; a hinge arm with a built-in drive shaft clipped into the housing cap and hold in place with clamping force; an actuator coupled to the built-in drive shaft; and at least one sealing component arranged between the actuator and the housing cap. This configuration in particular reduces the amount of components of recent hinge arm assemblies, wherein a direct contact with the driving actuator is provided. Still further, this configuration allows a less complex and time consuming assembly.

According to other embodiments, the housing cap may be made from a polymeric material, wherein in another aspect the polymeric material may be a self-lubricating material. Further, the hinge arm material may be selected from polymeric materials, glass-filled polymeric materials, metal materials and metal-alloy materials. In addition, the hinge arm assembly may further comprise a locking mechanism controlled by an electric actuator comprising at least one micro-switch. In another aspect, the locking mechanism may comprise a hook.

In another embodiment, the present disclosure provides a method for assembling a hinge arm assembly for a charge flap arrangement of a motor vehicle outlined above, comprising the steps providing a housing cap having at least one flexible hinge arm support; rotating and/or pushing and/or clipping a hinge arm with built-in drive shaft into the housing cap, wherein the at least one flexible hinge arm support provides an assembly space by being molded out of position; and pushing the at least one flexible hinge arm support into final assembled condition, by coupling a part of the charge flap housing to the at least one flexible hinge arm support. According to another embodiment, the method still further comprises the steps of attaching an actuator by pushing the same over the drive shaft; wherein at least one sealing unit is arranged between the actuator and the housing cap.

In another embodiment, pushing the at least one flexible hinge arm support into final assembled condition may be achieved by engaging a part of the charge flap housing into a pocket or recess of the hinge arm assembly, wherein the part of the charge flap housing and the pocket or recess form an interference fit. Furthermore, the housing cap may be made from a polymeric material. Still further, the polymeric material is a self-lubricating material.

The term "2K," as used herein, refer to a component comprising at least two different materials.

BRIEF DESCRIPTION OF DRAWINGS

Embodiments of the present disclosure will be discussed with reference to the accompanying drawings wherein:

FIG. 6 is a schematic view illustrating a cross section of the charge flap hinge arm and the housing cap in a non-final assembly condition.

FIG. 7 is a schematic view illustrating a cross section of the charge flap hinge arm and the housing cap in a final assembly condition.

In the following description, like reference characters designate like or corresponding parts throughout the figures.

DETAILED DESCRIPTION

Dimensional attributes used herein, such as upwards, upper, downwards, lower, inwards, inner, outwards, outer and the like are to be understood in the context of a motor vehicle, in particular a four-wheeled motor vehicle, and its main direction of travel. Furthermore, the ground supporting the motor vehicle is to be considered.

Figure 1:
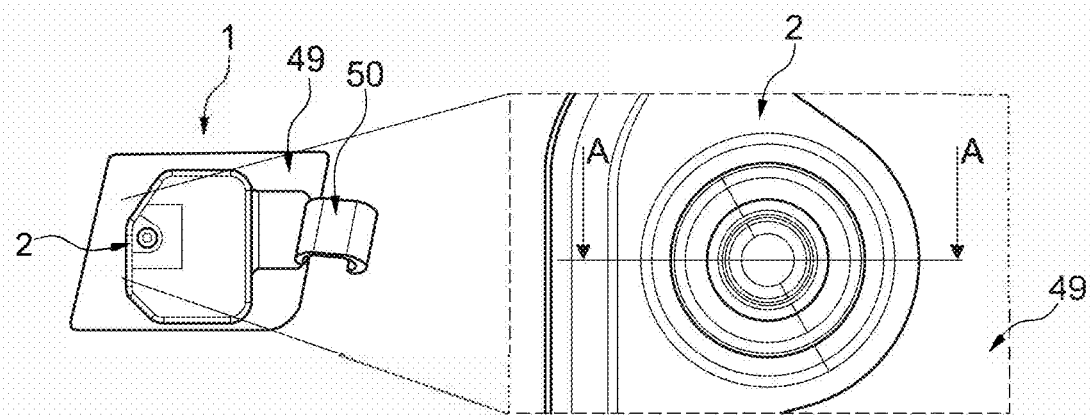
FIG. 1 is a schematic view of an engaging feature of a charge flap.
Figure 2:
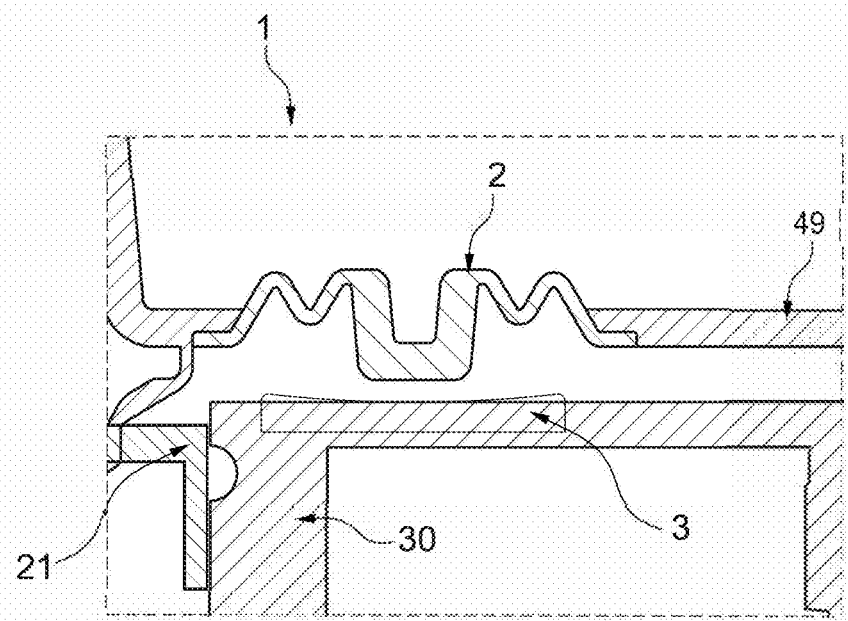
FIG. 2 is a schematic view illustrating a cross section taken along line A-A of the engaging feature of the charge flap of FIG. 1.

Referring now more specifically to FIG. 1 an enlarged view of an engaging feature 2 mounted in a charge flap arrangement 1, for example on the charge flap hinge arm assembly 49, 50 or on the inside of the charge flap cover, is shown. As shown in the illustrated embodiment, the charge flap hinge arm assembly may include a charge flap hinge plate 49 and a charge flap hinge arm 50. According to this embodiment, the engaging feature 2 is located on the left side of the charge flap arrangement 1 opposite to the emerging hinge arm 50. Pressing the engaging feature 2 leads to an unlocking of the charge flap housing, wherein the engaging feature 2 prevent a flap releasing button 3 from over pressurizing. The force applied to the engaging feature is distributed equally due to the specific form of the engaging feature and/or the material thereof. The engaging feature may be made from a rubber material that provides the necessary stability and force distribution. The engaging feature in this embodiment has a wave form, but may have any other form suitable to provide the necessary overpressure stability. Forces in the range of 5 to 100 N, 5 to 75 N, 5.5. to 52 N or the like can be absorbed. The mechanism is shown in detail in FIG. 2. According to the embodiment of FIG. 2 the flap releasing button 3 is located on the charging socket 30 opposite to the engaging feature 2. In this embodiment the flap releasing button 3 is a pressure sensor sensing the pressure that is provided by the engaging feature 2 when pressed by a user. The locking in this embodiment (not shown) may be achieved by any means known in the art, such as a mechanical locking mechanism, a magnetic locking mechanism, an electrical locking mechanism, any combination thereof, or the like.

Figure 3:
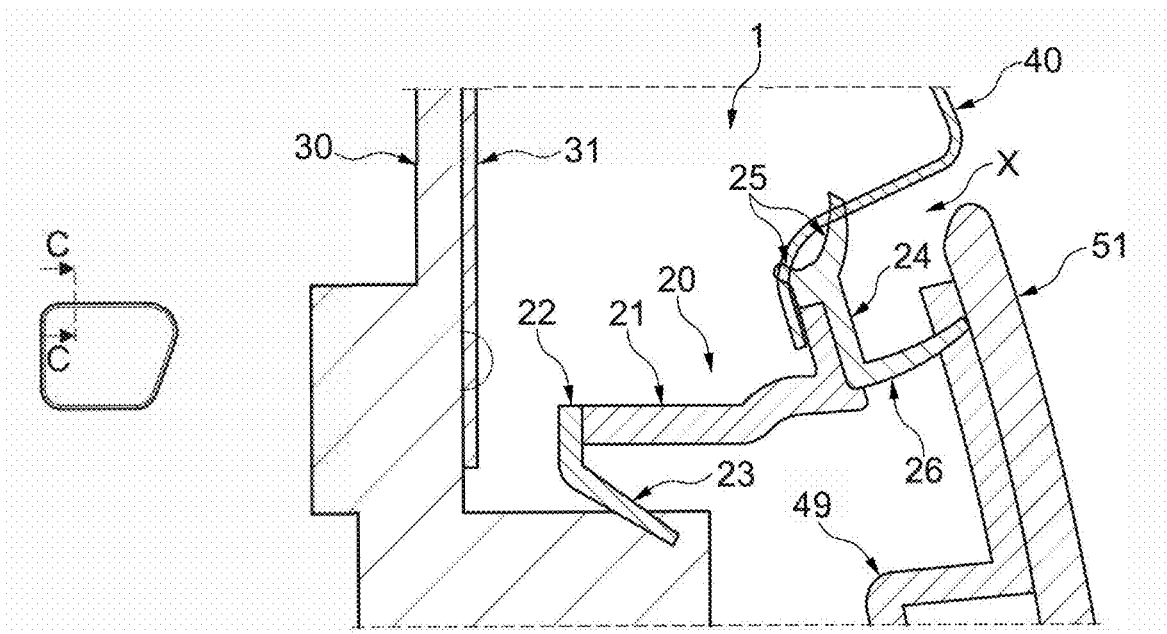
FIG. 3 is a schematic view illustrating a cross section taken along line C-C of the charge flap arrangement showing a cross section of an embodiment of the sealing unit.

Referring to FIG. 3, an exemplary embodiment of the inventive sealing unit is depicted. In this embodiment, a cross section along the line C-C of the charge flap arrangement 1 for a motor vehicle comprising a sealing unit 20 is shown. In this embodiment, the charge flap housing 21 comprises the charge flap cover 51 which is the outmost part that can be seen when the charge flap is closed, so that protection of the interior parts of the charge flap housing is provided. The charge flap arrangement 1 comprises charging socket 30, a body panel 40, a charge flap hinge arm assembly 49, 50 (the charge flap hinge arm 50 is not visible in FIG. 3), a charge flap cover 51 and an inner panel 31. The sealing unit 20 is formed as an 2K component arranged on the 2K charge flap housing 21 having an inner sealing portion 22 with one sealing lip 23 sealing to the charging socket 30, an outer sealing portion 24 with two sealing lips 25 sealing to the body panel 40 and one sealing lip 26 sealing to the 2K charge flap hinge plate 49. With this arrangement several sealing zones are created which may provide similar or different sealing qualities or sealing properties. For example, these sealing lips may provide a different degree of protection according to ISO 20653 and/or DIN EN 60529, such as protection against hazardous parts and the ingress of solid foreign objects (such as dust and the like) and/or protection against spraying water, splashing of water, water jets, immersion in water and the like. The level of protection can be managed by specifically selecting form and amount of the sealing lips and/or the material for each sealing lip. For example, the sealing lips may independently be formed from rubber or plastic material.

In other words, the sealing unit 20 is adapted to provide simultaneous sealing to the charging socket 30, for example of the IP5k4k type (i.e., having an ingress protection (IP) rating of IP5k4k as defined by the International Electrotechnical Commission (IEC)), via the one sealing lip 23, the body panel 40, for example of the IP6k9k type (i.e., having an IP rating of IP6k9k as defined by the IEC), via the two sealing lips 25 and the charge flap hinge plate 49, for example of the IP5k4k type, via the one sealing lip 26. The amount of sealing lips as well as the sealing device in form of the sealing lips can be varied according to the general knowledge of one skilled in the art. Furthermore, it is well known from those skilled in the art, that the sealing lips can be folded when pressing the charge flap inward and/or the lips can compensate the movement of the pressed charge flap.

For example, according to the embodiment of FIG. 3 a water flow channel and wind noise area X is provided by the outer sealing component 24, the body panel 40, charge flap hinge arm assembly 49, 50 and charge flap cover 51. According to other embodiments, the charge flap cover 51 and the 2K charge flap hinge arm assembly 49, 50 are the same component.

According to the specific embodiment of FIG. 3 the 2K charge flap housing 21 is substantially L-shaped and comprises an inner end supporting the inner sealing portion 22 and an outer end supporting the outer sealing portion, wherein the 2K charge flap housing 21 is adapted to emerge in an outwards direction substantially parallel to a ground (not shown) from its inner end, to bend in an upwards direction, to then continue in an outwards direction substantially parallel to the ground and to bend in an upwards direction substantially orthogonal to the ground to form the outer end of the central sealing portion 21. The inner sealing portion 22 is formed at the inner end of the central ceiling portion 21, wherein the inner sealing portion 22 is adapted to emerge in a substantially downwards direction and to form the sealing lip 23 by bending in an outwards direction. The outer sealing portion 24 comprises an upper end and a lower end and is formed at and substantially parallel to the outer end of the 2K charge flap housing 21, wherein the lower end of the outer sealing portion 24 is adapted to emerge in a substantially outwards direction to form the sealing lip 26, and the upper end of the outer sealing portion 24 is adapted to emerge in a substantially upwards and inwards direction to form one of the two sealing lips 25 and is adapted to emerge in a substantially upwards and outwards direction to form the other one of the two sealing lips 25. Other configurations are also encompassed by the present invention.

In an installed configuration, the sealing lip 23 of the inner sealing portion 22 is in contact with the charging socket 30, the two sealing lips 25 of the outer sealing portion 24 are in contact with the body panel 40 and the sealing lip 26 of the outer sealing portion 24 is in contact with the charge flap hinge plate 49. According to other embodiments, the sealing lip 26 of the outer sealing portion 24 may be in contact with the charge flap cover 51.

Figures 4A, 4B:
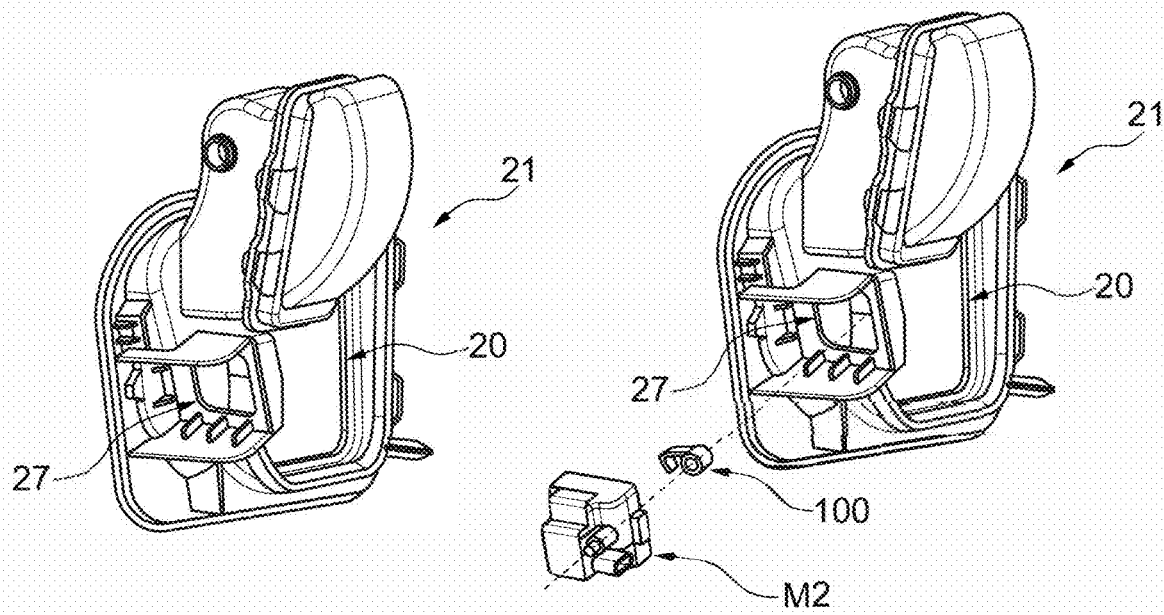
FIGS. 4a and 4b are a schematic views illustrating embodiments of the 2K charge flap housing.

FIGS. 4a and 4b show embodiments of the 2K charge flap housing 21 comprising the sealing unit 20 of FIG. 3 and a secondary sealing unit 27 for sealing the secondary actuator M2. The sealing unit 20 is formed around the inner rim of a primary opening of the 2K charge flap housing 21 and adapted to provide sealing between the 2K charge flap housing 21 and the charge flap hinge arm assembly 49, 50 and subsequently the charge flap cover 51 in a closed configuration. The secondary sealing unit 27 is formed around the inner rim of a secondary opening of the 2K charge flap housing 21 and adapted to provide sealing between a secondary actuator M2 and the 2K charge flap housing 21. The secondary actuator M2 is adapted to lock and unlock the 2K charge flap hinge arm assembly 49, 50 in a closed configuration via a locking part 100 that may be formed as a hook. Further, the secondary actuator M2 may be configured as an electromotive actuator having a microswitch that may be controlled by the first actuator M1 that actuates the 2K charge flap hinge arm 50. According to the an embodiment, the secondary actuator M2 operates with an electrical forward rotation but with a reverse rotation via spring return and a soft touch button (not shown).

Figure 5:
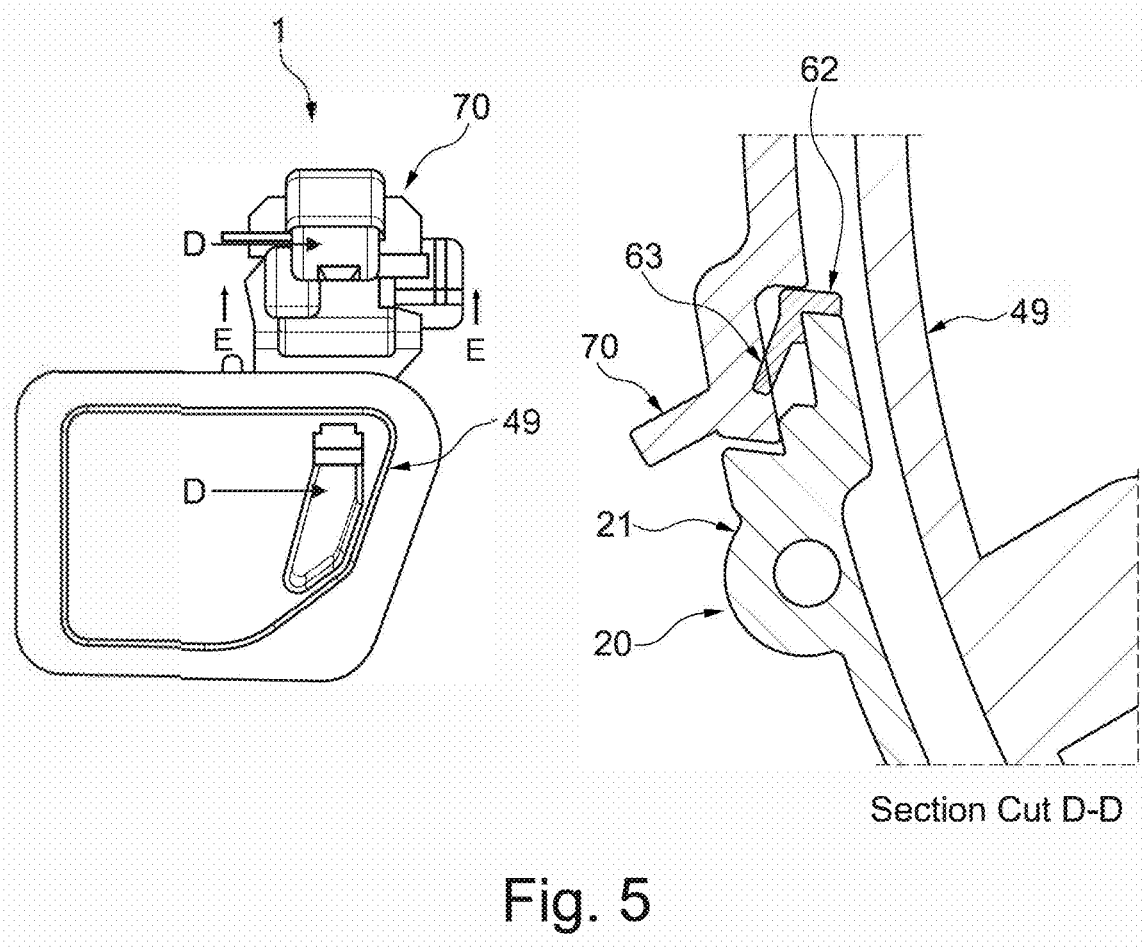
FIG. 5 is a schematic view illustrating a cross section taken along line D-D of the charge flap arrangement showing a cross section of an embodiment of the sealing unit.

FIG. 5 shows a cross section defined by the section cut D-D of the 2K charge flap arrangement 1 comprising the charge flap hinge arm assembly 49, 50, wherein the 2K charge flap housing 21 of the 2K charge flap arrangement 1 comprises a housing cap 70. (The hinge arm 50 portion of the charge flap hinge arm assembly is not visible in FIG. 5). Further, it is shown another section of the sealing unit 20 sealing the housing cap 70 with an upper sealing portion 62 and one sealing lip 63. The sealing lip 63 of the upper sealing portion 62 is adapted to provide sealing for example of the IP4k5k type. Other sealing types are also encompassed by this embodiment.

In an assembled configuration of this embodiment, the sealing lip 63 of the upper sealing portion 62 is in contact with an outer surface of the housing cap 70, wherein the upper sealing portion 62 is in contact with a lower surface of the housing cap 70. In addition, the 2K charge flap housing 21 is in contact with an outer and a lower surface of the housing cap 70.

FIG. 6 shows an exemplary cross section of an embodiment of a part of the charge flap hinge arm 50, further comprising a built-in driveshaft 52 in a non-final assembly condition, wherein the charge flap hinge arm 50 has been clipped into the housing cap 70. (The charge flap hinge plate 49 of the charge flap hinge arm assembly is not visible in FIGS. 6 and 7). In this embodiment, the housing cap 70 comprises a flexible hinge arm support 71 and two natural bearing surfaces 72. The two natural bearing surfaces 72 may be formed from any material suitable for supporting the charge flap hinge arm 50 in stability and movement. For example, the housing cap 70 may be made from a polymeric material but is not limited thereto. In the embodiment here, the housing cap 70 and thus the bearing surfaces 72 are made from a self-lubricating polymer. A self-lubricating material is generally preferred. The dashed-dotted line represents the rotational axis of the built-in driveshaft 52 of the charge flap hinge arm 50. The built-in driveshaft 52 of the charge flap hinge arm 50 is supported by only one natural bearing surface 72 and the flexible hinge arm support 71, wherein the flexible hinge arm support 71 providing the second natural bearing surface 72 is bent away from the in-built driveshaft 52 in the non-final assembly condition and thus providing an assembly space 75.

Furthermore, FIG. 6 shows an assembly portion 80 of the charge flap housing 21, that are prepared to be assembled into the respective pocket 74 of the housing cap 70. Further, the sealing component 90 and primary actuator M1 are shown in a non-assembled condition. According to this embodiment, the primary actuator M1 is provided as an active grille shutter actuator and is adapted to have integrated LIN electronics as well as diagnostics and a follow control, wherein the secondary actuator M2 (shown in FIG. 4b) may be controlled by the status of the primary actuator M1. Both the primary actuator and the secondary actuator is not limited to this specific embodiment and any actuator known in the art to be suitable for this purpose can be used.

FIG. 7 shows the same cross section as FIG. 6 but in a final assembling condition, wherein the flexible hinge arm support 71 providing the second natural bearing surfaces 72 is bent towards the built-in drive shaft 52 by the assembly portion 80 of the charge flap housing 21 in a final position. Further, in the final assembling position, the built-in driveshaft 52 of the charge flap hinge arm 50 is now supported by two natural bearing surfaces 72. The sealing component 90 is pushed onto the housing cap 70 and built-in driveshaft 52 for sealing the first natural bearings 72 and in some embodiments to reduce flutter in the system. The primary actuator M1 is pushed onto the built-in drive shaft 52, after the sealing component 90 is in its final position.

FIGS. 6 and 7 furthermore illustrate the steps to be done of the assembly of the charge flap arrangement 1: The charge flap hinge arm 50 of the charge flap hinge arm assembly 49, 50 and comprising the built-in driveshaft is assembled by being rotated, pushed and/or clipped into the housing cap 70. To facilitate the assembly of the charge flap hinge arm 50, the housing cap 70 is moulded with a flexible hinge arm support 71 which is adapted to be flexible in both directions within the elastic limit of its material. While the charge flap hinge arm 50 is clipped into the housing cap 70, the flexible hinge arm support 71 is bent away from the built-in drive shaft 52, in order to provide an assembly space 75. To finalize the assembly of the charge flap arrangement 1, the assembly portion 80 of the charge flap housing 21 is pushed into a pocket 74 of the housing cap 70, causing the flexible hinge arm support 71 to be bent towards the built-in drive shaft 52, thereby rotatably fixating the charge flap hinge arm 50 in the final position in the housing cap 70.

Variations and modifications of the foregoing are within the scope of the present disclosure. It is understood that the disclosure disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the teaching of the present disclosure and will enable others skilled in the art to utilize the teaching of the present disclosure. The claims are to be construed to include alternative embodiments to the extent permitted by the prior art. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

Various features of the disclosure are set forth in the following claims.

REFERENCE SIGN LISTING 1 charge flap arrangement
2 engaging feature
3 flap releasing button
20 sealing unit
21 2K charge flap housing
22 inner sealing portion
23 sealing lip
24 outer sealing portion
25 sealing lip
26 sealing lip
27 secondary sealing unit
30 charging socket
31 inner panel
40 body panel
49 charge flap hinge plate
50 2K charge flap hinge arm
51 charge flap cover
52 built-in driveshaft
62 upper sealing portion
63 sealing lip
70 housing cap
71 flexible hinge arm support
72 natural bearing surface
74 assembly pocket
75 assembly space
80 assembly portion of the charge flap housing
90 sealing component
100 locking part
X water flow channel and wind noise area
M1 primary actuator
M2 secondary actuator

The invention claimed is:

1. A hinge arm assembly for a charge flap arrangement of a motor vehicle, the hinge arm assembly comprises:
a housing cap having at least one flexible hinge arm support;
a charge flap housing coupled with the flexible hinge arm support;
a hinge arm with a built-in drive shaft clipped into the housing cap and held in place with clamping force;
an actuator coupled to the built-in drive shaft; and
at least one sealing component arranged between the actuator and the housing cap.

2. The hinge arm assembly of claim 1, wherein the housing cap is made from a polymeric material.

3. The hinge arm assembly of claim 2, wherein the polymeric material is a self-lubricating material.

4. The hinge arm assembly of claim 1, wherein the hinge arm is made of a material selected from polymeric materials, glass-filled polymeric materials, metal materials or metal-alloy materials.

5. The hinge arm assembly of claim 1, wherein the hinge arm assembly further comprises a locking mechanism controlled by an electric actuator comprising at least one micro-switch.

6. The hinge arm assembly of claim 5, wherein the locking mechanism comprises a hook.

7. A method for assembling a hinge arm assembly for a charge flap arrangement of a motor vehicle, comprising:

providing a housing cap having at least one flexible hinge arm support;

rotating, pushing, or clipping a hinge arm with built-in drive shaft into the housing cap, wherein the at least one flexible hinge arm support provides an assembly space by being molded out of position; and pushing the at least one flexible hinge arm support into final assembled condition, by coupling a part of a charge flap housing to the at least one flexible hinge arm support.

8. The method of claim 7, further comprising:

attaching an actuator by pushing the same over the drive shaft;

wherein at least one sealing unit is arranged between the actuator and the housing cap.

9. The method of claim 7, wherein pushing the at least one flexible hinge arm support into final assembled condition is achieved by engaging the part of the charge flap housing into a pocket or recess of the hinge arm assembly, wherein the part of the charge flap housing and the pocket or recess form an interference fit.

10. The method of claim 7, wherein the housing cap is made from a polymeric material.

11. The method of claim 10, wherein the polymeric material is a self-lubricating material.

* * * * *